United States Patent
Bayless et al.

(10) Patent No.: US 12,335,149 B1
(45) Date of Patent: Jun. 17, 2025

(54) LEAST PRIVILEGE NETWORK ACCESS CONTROLS ADVISOR

(71) Applicant: Amazon Technologies, Inc., Seattle, WA (US)

(72) Inventors: Samuel Bayless, Seattle, WA (US); John David Backes, Minneapolis, MN (US); Vaibhav Katkade, San Jose, CA (US); Daniel William Dacosta, Saint Paul, MN (US); Syed Mubashir Iqbal, Redmond, WA (US); Nadia Labai, Redmond, WA (US); Patrick Trentin, Minneapolis, MN (US); Nikolaos Giannarakis, Seattle, WA (US); Nathan Launchbury, Seattle, WA (US); Divya Raghunathan, Princeton, NJ (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 313 days.

(21) Appl. No.: 17/945,825

(22) Filed: Sep. 15, 2022

(51) Int. Cl.
*H04L 47/125* (2022.01)
*H04L 9/40* (2022.01)
*H04L 45/745* (2022.01)

(52) U.S. Cl.
CPC .......... *H04L 47/125* (2013.01); *H04L 45/745* (2013.01); *H04L 63/0263* (2013.01); *H04L 63/0272* (2013.01)

(58) Field of Classification Search
CPC . H04L 47/125; H04L 45/745; H04L 63/0263; H04L 63/0272
See application file for complete search history.

(56) References Cited

U.S. PATENT DOCUMENTS

2015/0192907 A1* 7/2015 Blevins .................. G05B 17/02
700/11
2022/0113888 A1* 4/2022 Cady .................... G06F 11/3419

FOREIGN PATENT DOCUMENTS

CN 109450893 A * 3/2019 ......... H04L 63/0263

* cited by examiner

*Primary Examiner* — Zhensheng Zhang
(74) *Attorney, Agent, or Firm* — Perilla Knox & Hildebrandt LLP; Thomas B. Hildebrandt

(57) ABSTRACT

Techniques implemented by a network-access analysis system to analyze network access controls for networks, identify traffic flows that are unobserved and unrequired, and determine proposed changes to the network access controls that restrict access from unobserved traffic flows. The system may analyze the network access controls, and determine whether unrequired traffic flows are allowed to be communicated in the network. For instance, the system may analyze network flow logs and identify observed traffic flows that are required by applications in the network, and also identify unobserved traffic flows that are permitted access to, but are not observed in, the network. The system may propose changes to the network access controls to restrict network access by these unobserved traffic flows. A network administrator can receive recommendations from the system regarding the proposed changes, and determine whether they would like to implement the proposed changes to their network access controls.

20 Claims, 13 Drawing Sheets

400

402 → DEFINE NETWORK ACCESS CONTROL ANALYSIS

Analysis Timing: Define when your network access controls are analyzed

☐ Periodic – Have your network access controls analyzed according to a period of time

[ Select desired period of time ▼ ]

☑ Configuration Change – Have your network access controls analyzed in response to detecting a network configuration change ☑ User Request – Have your network access controls analyzed in response to submitting a request

404 →

Network Access Controls: Select which network access controls for which you would like to receive proposed changes ☐ Security Groups – Receive proposed changes to add, remove, or modify security groups ☑ Network ACLs – Receive proposed changes to add, remove, or modify network ACLs ☑ Network Firewalls – Receive proposed changes to add, remove, or modify network ACLs ☑ Route Tables – Receive proposed changes to add, remove, or modify routes in route tables ☐ Unused IP Addresses – Receive proposed changes to remove IP addresses that are allocated and unused or not permitted

406 →

Defined Permitted Flows: Define traffic flows for which you do not want to receive proposed changes

| Protocol | Source | Dest | Src Port | Dest Port | Action |
|---|---|---|---|---|---|
| SSH | 10.0.0.1/24 | Any | Any | Any | Allow |

[ + Input New Permitted Traffic Flow ]

408 →

Defined Permitted IP Addresses: Input IP addresses that are permitted to communicate traffic flows in your network

[ 10.10.1.1/32 – 10.10.1.32/32, 10.10.2.40/32, ... ]

[ Cancel ]  [ Apply Analysis ]

LEAST PRIVILEGE NETWORK ACCESS CONTROLS ADVISOR

BACKGROUND

Service providers offer cloud-based services to fulfill users' computing-service needs without the users having to invest in and maintain computing infrastructure required to implement their services. These service providers maintain networks of managed computing resources and functionality to implement various types of scalable, on-demand services, to support applications of the users. Specifically, the service providers may maintain networks of data centers, which in turn may include a number of interconnected computing devices (or "servers"), that provide computing resources to support applications of the users. Users may be provided with logically isolated portions of the service provider network, often referred to as virtual networks or virtual private clouds (VPCs), in which they can launch resources to support their applications. Due to the logical isolation of VPCs, users are provided full control over resource placement, connectivity between resources, and security for their VPCs. For instance, users can configure routing tables that includes routes for steering network traffic between their resources. Additionally, users can define various network access controls for their VPCs, such as firewall controls (e.g., security groups, network access control lists (ACLs), network firewalls, etc.), that include sets of rules and/or policies for allowing or denying traffic from being communicated between resources. Thus, users have management control over many aspects of their VPCs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a graphical user interface through which a user of a network can define parameters for a network-access analysis system to use when analyzing network access controls for the network.

DETAILED DESCRIPTION

Figure 1:
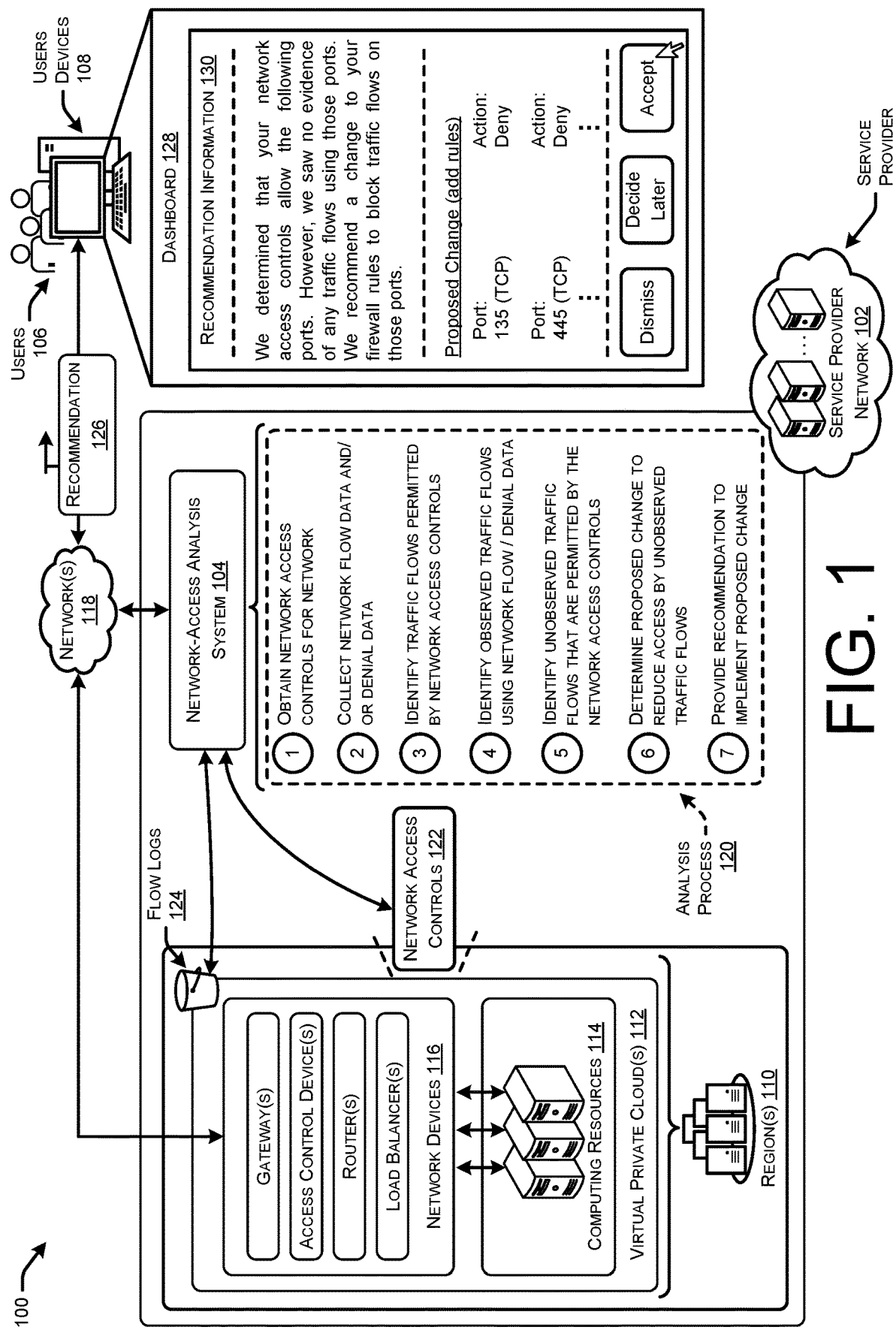
FIG. 1 illustrates a system-architecture diagram of an example environment in which a network-access analysis system identifies traffic flows that are unobserved in a network, but admitted under the current network access controls. The system further provides user accounts with recommendations of proposed changes to the network access controls to restrict network access for the unobserved traffic flows.

Ensuring secure networks is a key concern, for example for customers of a cloud provider network. This disclosure describes techniques implemented by a network-access analysis (NAA) system to analyze network access controls for networks, identify traffic flows that pose potential security threats to the network (e.g., unobserved/unnecessary traffic flows), and determine proposed changes to the network access controls that restrict network access granted to unnecessary traffic flows. For example, the NAA system can automatedly assist users with maintaining "least privilege permissions" for their network settings: adjusting firewall and access controls to limit the traffic allowed in their network to just the minimal traffic which is required by their applications. Without the NAA system, least privilege permissions analysis involves auditing of existing access controls and a manual comparison between those controls and the actual requirements of the applications running in the network. This comparison is risk-prone because users may not have full visibility into the current requirements of their application(s), and so they may inadvertently tighten security controls in a way that blocks needed traffic, resulting in outages of the service provided by their applications. Conversely, the difficulty and risk of manually auditing and tightening access controls (of which a user may have thousands) can lead users to err on the side of leaving their networks more open required rather than risking a service outage.

The disclosed NAA system addresses these concerns, among others, by providing an automated network least privilege analysis. The NAA system may combine static analysis to find all possible paths in a given network configuration and active traffic analysis to sample traffic in the network from a representative time period (ex: using network flow logs). To identify admitted traffic flows, the NAA system may obtain and analyze various types of network access controls, such as firewall rules, route tables, network ACLs, allocated IP addresses, and so forth. Based on this analysis, the NAA system may determine whether traffic flows are allowed to be communicated in the network, but are unrequired or unused by the applications or resources in the network. For instance, the NAA system may analyze network flow logs and identify observed traffic flows that are required by the applications, and also identify unobserved traffic flows that are permitted access to the network under the network access controls, but are not seen in the network. In such examples, the NAA system may propose changes to the network access controls to restrict network access for these unobserved traffic flows, while ensuring that those changes would not block any of the actual observed traffic in the network. A network administrator, or other user, of the network can receive recommendations from the NAA system regarding the proposed changes, and determine whether or not they would like to implement the proposed changes to their network access controls. By identifying paths that are admitted by the static analysis, but that do not appear in the flow logs, the NAA can automatically identify unused or overly permissive network configurations (such as access controls, routes, or other network resources) that can be safely restricted (or removed entirely) without interfering with existing traffic. This allows users to automate the process of maintaining minimally permissive network access controls as their network changes as well as audit their network for continued compliance with least privilege access.

Network access controls are used by network administrators and other users to restrict unauthorized access to a network and the computing resources in that network. As described herein, network access controls can be any policy or control that can restrict or allow access to a network and/or resources therein. Network access controls can come in various forms, such as network firewalls, network ACLs, security groups, routing tables, load balancing policies, allocated IP addresses, and so forth. Network administrators set up these network access controls to ensure that their networks are secure and only authorized communications and/or other access to their networks are permitted. These network access controls help prevent attacks on networks, resources, and data contained therein. However, as networks and the applications running therein continue to grow, the network administrators may have to adjust their network access controls to allow for new traffic required by new applications, and to also maintain a secure network. However, these networks can be extremely complex, and the administrators or user may not have the resources to update their network access controls to maintain secure networks. The NAA system may analyze network access controls, identify unrequired or unobserved traffic flows that are allowed in the network, and determine changes to the network access controls to remove access from the unrequired or unobserved traffic flows.

The NAA system may obtain network access controls for the network that is under analysis to determine the range of allowed traffic flows that are permitted access to the network. For instance, the NAA system may identify source and destination IP addresses, such as IP address ranges, that are indicated as "allowed" by firewall controls for the network. As another example, the NAA system may analyze route tables and identify sources and destinations of routes that terminate in, or pass through, the network. As a further example, the NAA system may identify IP addresses (e.g., classless inter-domain routing (CIDR) blocks) assigned for use by resources in the network and are allowed under firewall controls. In this way, the NAA system may determine what traffic flows (e.g., 5-tuples) are permitted or allowed access to the network under the current network access controls.

Further, the NAA system may obtain network flow data for the network under analysis. The network flow data may be in the form of flow log records and represent network traffic flows through various resources or components of the network. A flow log record may capture traffic flow information such as a network IP traffic flow, which may be a 5-tuple on a per network interface basis, that occurs within an aggregation interval (or capture window). The aggregation window is the period of time during which a particular flow is captured and aggregated into a flow log record (e.g., one minute, ten minutes, etc.). The network access controls may include various types of network access controls, such as firewall rules, route tables, network ACLs, IP addresses, and so forth. The NAA system may analyze the network flow data that was collected over a period of time (e.g., one week, one month, one year, etc.), and determine what traffic flows were observed in the network during that period of time. The NAA system may determine that these observed traffic flows are necessary, required, otherwise used by the applications/resources in the network, and that they should be permitted access to the network by the network access controls.

However, the NAA system may determine that permitted, but unobserved, traffic flows may be potential security threats, or simply unrequired, and propose changes to the network access controls to "tighten up" the network access controls by restricting access to the network for these unobserved traffic flows. Following the above examples, the NAA system may determine a change such as adding, or modifying, firewall controls to change IP addresses for unobserved flows from "allow" to "deny" such that traffic on the unobserved flows are no longer given network access. As another example, the NAA system may determine a proposed change to a route table by removing, or modifying, a route in a routing table that prevents the unobserved traffic flow from being allowed to be communicated in the network.

In some examples, rather than entirely restricting an unobserved traffic flow from accessing the network, the NAA system may restrict network access to only a portion of the network. For instance, the NAA system may modify route tables, load balancing policies, etc., such that a particular unobserved traffic flow is only allowed access to resources or applications in the network for which there are no security concerns or other concerns. For instance, web traffic flows may be allowed access to web servers located in a network that service the web traffic flows, but those same web traffic flows may be restricted from accessing a database in the backend of the application. As another example, a network may include, or be partitioned into, multiple subnetworks, and certain traffic flows may be allowed access to one subnetwork, but not another subnetwork, according to the network access controls defined herein.

In some instances, the NAA system may identify traffic flows that are observed, but denied by current network access controls, which can be used to determine proposed changes to the network access controls. For instance, network access controls often have multiple layers of access controls through which traffic flows traverse. In some examples, an outer-layer control may be allowing traffic that ends up being dropped by an inner-layer control. In such examples, the NAA system may determine to modify the outer-layer access control to drop the traffic flows at that layer. As another example, two or more network access controls may be redundant in that they filter the same traffic flows. In such an example, the NAA system may remove one of the network access controls to reduce the total amount of network access controls that need to be evaluated. Accordingly, various types of changes to network access controls described herein may not necessarily be with respect to unobserved traffic flows, but may be performed in response to a more static analysis of network access controls.

The NAA system can evaluate whether a proposed change to the network access controls is "safe" before recommending it to the user. A safe change would not interrupt existing application traffic. To do so, the NAA system can evaluate whether a proposed change to the network access controls would block any of the observed traffic by re-computing the set of all possible paths in the network on the proposed altered network configuration, and determining whether after that change any of the observed traffic in the network is no longer admitted in the statically determined set of possible paths. The NAA system can then perform an automated search over the space of more restricted configurations of the customer's existing network access controls, and identify the most restrictive such configuration that passes the above check (which is the most restrictive configuration that does not block any recently observed network traffic).

After determining proposed changes, the NAA system may provide a user account associated with the network with a recommendation to implement the proposed changes to their network access controls. In an example where the network is a VPC, subnet, or other network construct in a cloud/service provider network, the NAA system may provide the recommendation to a user account associated with the cloud provider network. In some examples, the NAA system may monitor an on-premises network, and in such examples, the NAA system may provide the recommendation to an administrator device associated with the network. The recommendation may include an explanation regarding the proposed changes, an indication of the current network access control and the proposed change, and one or more options for responding to the recommendation. For instance, the recommendation may be presented via one or more user interfaces that include selectable options for applying/accepting the proposed changes, dismissing the proposed changes, and/or a request to decide later and store the recommendation in a queue. The NAA system may work in conjunction with other services to apply the proposed changes to the network access controls in examples where the user would like to accept the recommended changes.

The NAA system may perform the analysis of the network access controls to identify proposed changes in response to various events. For example, the NAA system may simply perform the analysis of the network access controls periodically, or according to a schedule (e.g., daily, weekly, monthly, etc.). Additionally, or alternatively, the NAA system may perform the analysis of the network access controls in response to detecting a change in the network, such as a configuration change, additions or removals of resources or network components, and/or other changes associated with the network. As a further example, the NAA system may perform the analysis in response to receiving a request from an authorized user associated with the network (e.g., administrator, network engineer, etc.).

The NAA system described herein may automatically collect network flow data and network access controls and analyze this data at scale across one or more networks of one or more users to generate proposed changes for network access controls of the networks. Users may register for use of the NAA system and indicate which networks (e.g., VPCs, subnetworks, etc.) and/or other networking resources they would like to have monitored and managed by the NAA system. The NAA system may improve the security of networks while allowing traffic flows needed by the applications and resources to continue being communicated. The techniques described herein solve problems rooted in technology that are unable to be performed by humans today, and improve upon techniques performed today. For instance, the NAA system may more accurately and efficiently identify proposed changes to network access controls than manual, human techniques. In this way, potential security threats are identified and remedied faster and more often as compared to traditional techniques, and this improves the security of networks.

The techniques described herein are with reference to a service provider network, such as a cloud provider network or platform, and networks such as VPCs, subnetworks (or "subnets"). However, the techniques are equally applicable to any network and in any environment. For example, the NAA system may monitor an on-premises network, and in such examples, the NAA system may provide the recommendation to an administrator device associated with the on-premises network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a service provider network 102 offers a network-access analysis (NAA) system 104 that identifies traffic flows that are unobserved in a network, but admitted under the current network access controls. The NAA system 104 further provides user accounts with recommendations of proposed changes to the network access controls to restrict network access for the unobserved traffic flows.

The service provider network 102 may be operated and/or managed by a service provider and may provide various services to users to fulfil their computing resource needs, such as cloud-based computing resources. For instance, users 106 may operate user devices 108 in order to register for use of the computing resources of the service provider network 102. The service provider network 102 may include a network-access analysis (NAA) system 104 that includes components for analyzing network access controls and network flow data to identify unnecessary or unobserved traffic flows with access to a network, and determining proposed changes for the network access rules that restrict the network access of the unnecessary, unwanted, and/or unobserved traffic flows. Generally, the NAA system 104 may be, at least partly, a control-plane system that controls operations occurring in the service provider network. The NAA system 104 may be either centralized or distributed, and be supported by one or more computing devices.

As illustrated, a service provider network 102 may be operated and/or managed by a service provider. The service provider network 102 may provide various services to users to fulfil their computing resource needs, such as cloud-based computing resources. For example, the service provider network 102 may provide cloud-based, scalable, and network accessible compute power services, storage services, database services, and/or other services. Users may utilize user devices to subscribe for use of the computing resources and/or services provided by the service provider network 102.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network 102 can be formed as a number of regions 110, where a region 110 is a separate geographical area in which the cloud provider clusters data centers. Each region 110 can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region 110 are positioned far enough away from one other that the same natural disaster should not take more than one availability zone offline at the same time. Users 106 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region 110 can operate two or more TCs for redundancy. Regions 110 are connected to a global network which includes private networking infrastructure (e.g., fiber connections controlled by the cloud provider) connecting each region 110 to at least one other region 110. The cloud provider network may deliver content from points of presence outside of, but networked with, these regions 110 by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 102 may provide on-demand, scalable computing services to users 106 through a network, for example allowing users 106 to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 106, the hardware associated with the virtual computing devices can be scaled up or down depending upon the resources the user 106 requires. Users 106 can choose to deploy their virtual computing systems to provide network-based services for their own use and/or for use by their users or client.

The cloud provider network 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 106 of the cloud provider network 102, which may be provisioned in user accounts.

The service provider network 102 may offer many different built-in services to the users 106 to help run their applications and services. For instance, the service provider network 102 may provide users 106 with use of VPCs 112, which are logically isolated sections of the service provider network 102 that serve as private virtual environments to which only permitted users 106 have access to use. As noted above, users 106 may have multiple VPCs, potentially spanning across different regions 110 of the service provider network 102. To help interconnect VPCs 112 and other resources of the user's computing infrastructure, the service provider may also offer many different built-in networking services. The VPCs 112 may be used by the users 106 to create subnetworks, configure personalized route tables, choose IP addresses, monitor connections, screen network traffic, restrict access into the VPCs 112, and/or for other operations. As shown, the VPCs 114 include or run computing resources 114, such as servers, virtual machines (VMs), containers, serverless functions, workloads, processes, etc. Generally, the computing resources 114 are used to support or run applications or services of the users 106.

A virtual private cloud (VPC) (also referred to as a virtual network (VNet), virtual private network, or virtual cloud network, in various implementations) is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC, security groups), and transit paths.

A VPC can be a virtual network dedicated to a particular customer account (or set of related customer accounts, such as different customer accounts belonging to the same business organization). A VPC is logically isolated from other virtual networks in the cloud. Customers can launch resources, such as compute instances, into a VPC. When creating a VPC, a customer can specify a range of IPv4 addresses for the VPC in the form of a Classless Inter-Domain Routing (CIDR) block. A VPC can span all of the availability zones in a particular region. After creating a VPC, a customer can add one or more subnets in each availability zone or edge location.

In addition to the VPC 112 including computing resources 114 to support workloads, applications, services, etc., the VPC 112 may further include or be associated wither other network devices 116, such as gateways, access control devices (e.g., firewalls, network firewalls, security groups, etc.), routers, load balancers, and so forth. These devices may perform different networking functions. For instance, gateways may provide the computing resources 114 with access to the Internet, other VPCs, other regions, and so forth. The access control devices may enforce various policies and/or sets of rules for allowing or denying traffic from various sources, and to various destinations. The routers may route data between different devices, and the load balancers may control how traffic flows are distributed between the computing resources 114.

As the various network devices 116 and computing resources 114 or components in the network infrastructure communicate network traffic, processes associated with the devices or components may monitor these communications and populate flow logs 124 with records of the communications. Flow logs 124 can be created for various services or resources including VPCs 112, subnets, network interfaces, routers, access control devices, load balancers, network gateways, NAT gateways, and so forth. Flow log data for a monitored network interface or resource is recorded as flow log records, which are log events consisting of fields that describe the network traffic flow. Generally, the flow log records 124 include a network IP traffic flow, which may be a 5-tuple (e.g., source/destination IP addresses, source/destination port numbers, and protocol), on a per network interface or resource basis that occurs within an aggregation interval (or capture window). The aggregation window is the period of time during which a particular flow is captured and aggregated into a flow log record 124 (e.g., one minute, ten minutes, etc.). The flow log records may additionally include data such as the number of packets transferred, the number of bytes transferred, the start and end time of the communication, and/or other information.

Additionally, the VPCs 112 may be associated with, and/or managed using, network access controls 122. The network access controls 122 are used by network administrators 106, or other users 106, to restrict unauthorized access to the VPCs 112 and the computing resources 114 in those networks. As described herein, network access controls 122 can be any policy or control that can restrict or allow access to the VPCs 112 and/or the computing resources 114 therein. Network access controls 122 can come in various forms, such as network firewalls, network ACLs, security groups, routing tables, load balancing policies, IP address spaces, and so forth. The users 106 can set up these network access controls 112 via their user devices 108 to ensure that their VPCs 112 are secure and only authorized communications and access to their VPCs 112 are permitted. These network access controls 122 help prevent attacks on VPCs 112, computing resources 114, and data contained therein.

The NAA system 104 can perform automated least privilege analysis and output recommendations to the VPC users to align their access settings with least privilege settings. The NAA system 104 may, at "1," obtain network access controls 122 for the VPC 112 that is under analysis to determine the range of allowed traffic flows that are permitted access to the VPC 112. The network access controls 112 may be periodically obtained in a using push and/or pull mechanisms. At "2," the NAA system 104 may collect network flow data, which may be contained in the flow logs 124. The NAA system 104 described herein may automatically collect the flow log records 124 from the flow logs 124 and analyze these flow log records 124. The NAA system 104 may periodically, or continuously, obtain flow log records for those VPCs 112 and other network devices 116. The NAA system 104 104 may run processes that pull the flow log records from the disparate flow logs 124, and/or the flow logs 124 may have processes that push the flow log records to the NAA system 104. Additionally, or alternatively, the NAA system 104 may collect denial data which indicates traffic flows that were denied by the current network access controls 122.

At "3", the NAA system 104 may identify traffic flows permitted by the network access controls 122. For instance, the NAA system 104 may identify source and destination IP addresses, such as IP address ranges, that are indicated as "allowed" by firewall controls for the VPC 112. As another example, the NAA system 104 may analyze route tables and identify sources and destinations of routes that terminate, or pass through, the VPC 112. As a further example, the NAA system may identify IP address ranges (e.g., classless inter-domain routing (CIDR) blocks) assigned for use by computing resources 114 in the VPC 112 and are allowed under firewall controls. In this way, the NAA system 104 may determine what traffic flows (e.g., which 5-tuples) are permitted or allowed access to the VPC 112 under the current network access controls 122.

At "4," the NAA system 104 may identify observed traffic flows that are permitted by the network access controls 122. For instance, the NAA system 104 may analyze the network flow data (e.g., flow logs 124) that was collected over a period of time (e.g., one week, one month, one year, etc.), and determine what traffic flows (e.g., 5-tuples) were observed in the VPC 112 during that period of time. The NAA system 104 may determine that these observed traffic flows are necessary, required, otherwise needed by the applications/resources in the VPC 112, and that they should be permitted access to the VPC 112 by the network access controls 122. In some examples, the NAA system 104 may use the denial data to identify observed, but unwanted, traffic flows that were blocked by the current network access controls 112.

At "5," the NAA system 104 may identify unobserved traffic flows that are permitted by the network access controls 122. These permitted, but unobserved, traffic flows may be potential security threats, or may simply be unrequired by the applications. The NAA system 104 may identify which of the permitted traffic flows were not observed in the flow logs 124 during the period of time, and classify those permitted traffic flows as unobserved traffic flows.

At "6," the NAA system 104 may determine proposed changes to reduce access to the VPC 112 by the unobserved traffic flows. For instance, the NAA system 104 may determine a change such as adding, or modifying, firewall controls to change IP addresses for unobserved flows from "allow" to "deny" such that traffic on the unobserved flows are no longer given network access. As another example, the NAA system 104 may determine a proposed change to a route table by removing, or modifying, a route in a routing table that prevents the unobserved traffic flow from being allowed to be communicated in the VPC 112. In some examples, rather than entirely restricting an unobserved traffic flow from accessing the network, the NAA system 104 may restrict access to only a portion of the network. For instance, the NAA system 104 may modify route tables, load balancing policies, etc., such that a particular unobserved traffic flow is only allowed access to resources, subnetworks, or applications in the VPC 112 for which there are no security concerns or other concerns.

At "7," the NAA system 102 may provide one or more recommendations to implement one or more proposed changes to the network access controls 122. The recommendation(s) 126 may be sent from the NAA system 104. The recommendations 126 may be sent over one or more networks 118 to the user devices 108. The network(s) may be one or more of wide area networks (WANs), personal area networks (PANs), local area networks (LANs), and/or any other type of network or combination of networks (wired and/or wireless).

As shown, the recommendation 126 may be presented in a dashboard 128 on a display of the user device 108 and include various recommendation information 130. The recommendation information 130 may include an explanation regarding the proposed changes. In this case, the explanation indicates that network access controls 122 allow traffic on some ports, but that the flow logs 124 indicated that traffic flows have not been received on the ports. The explanation then explains how the proposed change is to block traffic flows on these ports as they are not being used, and may be susceptible to a threat, such as a port scan attack. The recommendation information 130 may further indicate the proposed change, which is to deny packets or traffic received on the specific ports for which traffic has not been observed. Further, the dashboard 128 may include one or more selectable options for the user 106 to select in response to the recommendation 126. As shown, the user 106 can dismiss the recommendation, decide later and store it in a queue for later, or accept the recommendation and have the proposed change applied to their network access controls 122.

In examples where the user 106 selects the option to accept the proposed change, the NAA system 104 may work in conjunction with other services of the service provider network 102 to apply the proposed changes to the network access controls 122.

In an example where the network under analysis is a VPC 112 of a service provider network 102, the users 106 may have created user accounts with the service provider to utilize the resources 114 of the service provider network 102. The users 106 may utilize their devices 108 to communicate over one or more networks 118 (e.g., WANs, PANs, LANs, etc.) with the service provider network 102. The user devices may comprise any type of computing device configured to communicate over network(s) 118, such as mobile phones, tablets, laptop computers, desktop computers, televisions, servers, and/or any other type of computing device. The users 106 (e.g., network administrators, organization employees, etc.) may interact with the service provider network 102, via their user account and/or one or more user portals (e.g., web console, command line interface (CLI), application programming interface (API), etc.).

The NAA system 104 may perform the analysis of the network access controls to identify proposed changes in response to various events. For example, the NAA system 104 may simply perform the analysis of the network access controls 122 periodically, or according to a schedule (e.g., daily, weekly, monthly, etc.). Additionally, or alternatively, the NAA system 104 may perform the analysis of the network access controls 122 in response to detecting a change in the VPC 112 or other network, such as a configuration change, additions or removals of resources 112 or network devices 116, and/or other changes associated with the VPC 112. As a further example, the NAA system 104 may perform the analysis in response to receiving a request from an authorized user 106 associated (e.g., administrator, network engineer, etc.).

Generally, the NAA system 104, and components thereof, may comprise software, firmware, and/or other logic that is supported one computing device, or across more computing devices in the service provider network 102. Additionally, the NAA system 104 may comprise a system of other devices. The techniques described herein are generally described with respect to a service provider network, such as a cloud provider network or platform. However, the techniques are generally applicable for any network, such as on-premises networks, hybrid networks, and so forth.

Figure 2:
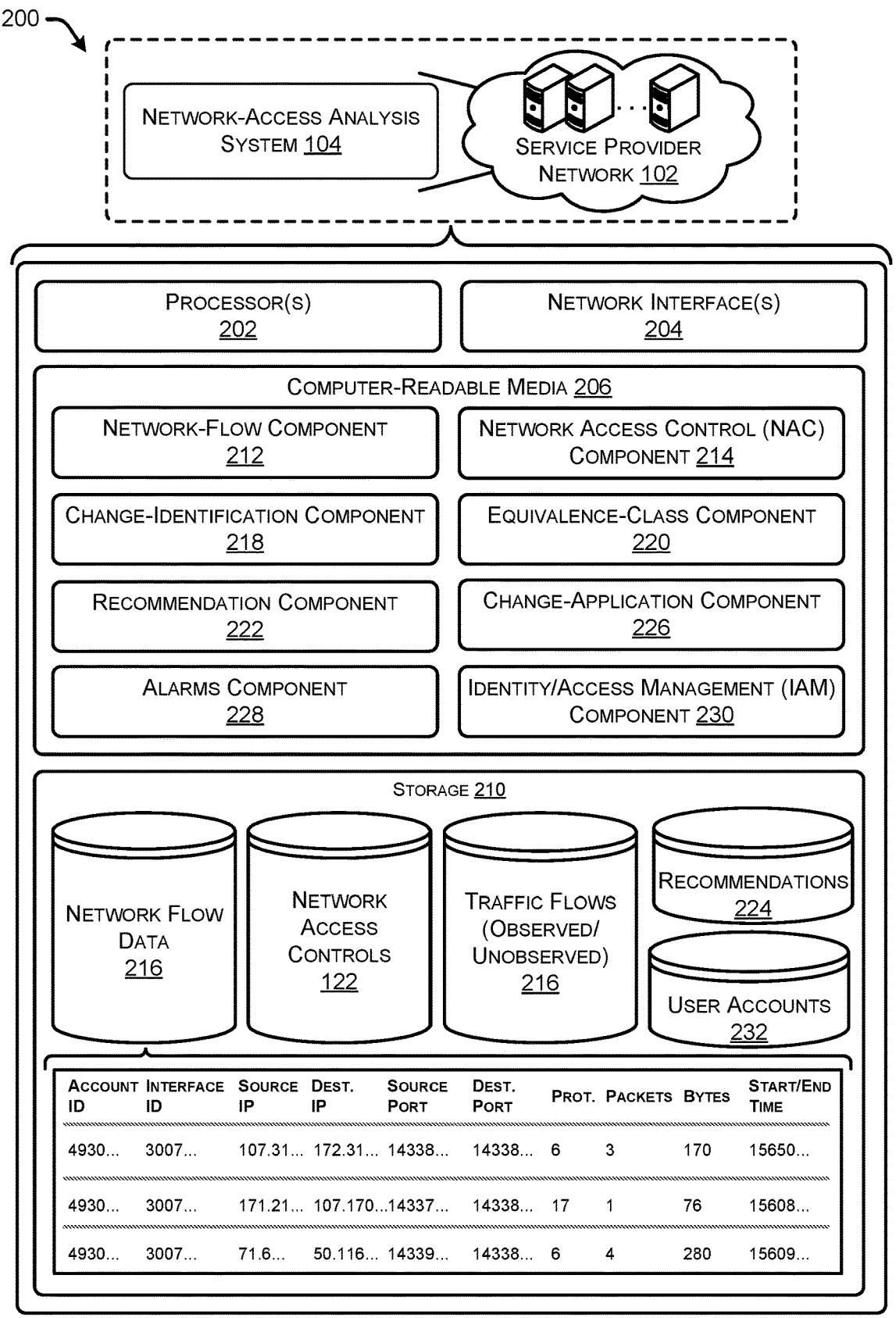
FIG. 2 illustrates a component diagram of example components of a network-access analysis system that provides user accounts with recommendations for proposed changes to network access controls to restrict network access for traffic flows that are unobserved and/or possible security threats.

FIG. 2 illustrates a component diagram 200 of example components of a network-access analysis system 104 that provides user accounts with recommendations for proposed changes to network access controls 122 to restrict network access for traffic flows that are unobserved and/or possible security threats. The components of the NAA system 104 can perform automated least privilege analysis and output recommendations to the VPC users to align their access settings with least privilege settings.

As illustrated, the service provider network 102 may include one or more hardware processor(s) 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s), and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include a data store, or storage 208, which may comprise one, or multiple, repositories or other storage locations for persistently storing and managing collections of data such as databases, simple files, binary, and/or any other data. The storage 208 may include one or more storage locations that may be managed by one or more database management systems.

The computer-readable media 206 may store portions, or components, of the NAA system 104 described herein. For instance, the computer-readable media 206 may store and/or execute a network-flow component 212 that determines and/or obtains network flow data 216 from flow logs 124. The network flow data 216 may include information abouts flows, such as a 5-tuple (e.g., source and destination IP addresses, protocol, source and destination port numbers), timestamp information indicating starts and stops of the traffic flows, applications associated with the traffic flow, number of packets, bytes, account ID, and/or other information.

The computer-readable media 206 may store and/or execute a NAC component 214 that is configured to collect and/or analyze network access controls 122. The NAC component 214 may determine, using the network access controls 112, traffic flows that are permitted to be communicated through and/or terminate in networks, such as VPCs 112. For instance, the NAC component 214 may analyze network access controls 122 (e.g., firewall rules, route tables, IP spaces, load-balancing policies, etc.) and identify what source and destination IP address are permitted to communicate in the network, what source and destination ports are permitted to communicate in the network, what protocols are accepted in the network, and so forth. This information can be used to stitch together or determine the total space of allowed/permitted traffic flows 216, both unobserved and observed.

The computer-readable media 206 may store and/or execute a change-identification component 214 that is configured to identify proposed changes for the network access controls 122. As an example, the change-identification component 214 may be configured to identify a plurality of traffic flows that are allowed to be communicated in the network, but have not been observed for a period of time as indicated by the network flow data. The change-identification component 214 may determine proposed changes to tighten the network access controls 112 by restricting the unobserved traffic flows from having network access (e.g., disallowing network access entirely, permitting network access to only a specific portion of the networks, etc.).

The computer-readable media 206 may store and/or execute an equivalence-class component 214 that is configured to determine equivalence classes for the network access controls 122. The equivalence-class component 214 may analyze, for instance, IP addresses defined in user-defined prefix lists, user-defined firewall controls, user-defined route tables, and so forth. Based on the analysis, the equivalence-class component 214 may determine equivalence classes, or logical grouping of addresses in the networks of the user 106 and utilize those to inform the proposed changes that the NAA system 102 recommends for the users 106. For instance, rather than proposing the most detailed, precise rule to block unobserved traffic flows, the equivalence-class component 214 may determine a less precise rule that covers the unobserved traffic flows, but is a same or similar equivalence class as the user-defined rules and IP address ranges. Thus, the change-identification component 214 may determine a plurality of proposed changes that all restrict access for a particular range of IP addresses, but with different precisions or levels of granularity. The equivalence-class component 214 may then select the proposed change that is in the same, or similar, equivalence class as the user-defined rules/routes/ranges.

The computer-readable media 206 may store and/or execute a recommendation component 222 that determines recommendations to send to the users 106 that indicate the proposed changes. The recommendation component 222 may be configured to generate explanations as to why the proposed changes are being suggested, and/or how the proposed changes remedy network issues or improve the network access controls 122 for networks. The recommendation component 222 may send these recommendations to the users 106.

The computer-readable media 206 may store and/or execute an alarms component 228 that is configured to output alarms to users 106 in response to determining proposed changes for the user 106 to view. In some instances, the alarms component 228 may be configured to notify or alarm users 106 for more critical proposed changes for network access controls 122 that may pose high security concerns (e.g., accessible ports or IP addresses associated with sensitive data or applications).

To utilize the services provided by the service provider network 102, the users 106 may register for an account 232 with the service provider network 102. For instance, users 106 may utilize a user device to interact with an identity and access management (IAM) component 230 that allows the users 106 to create user accounts 232 with the service provider network 102. Generally, the IAM component 230 may enable the users 106 to manage their network infrastructures remotely, and view analytics provided by the NAA system 104. Generally, the different user accounts 232 can assume different roles, or sets or permissions/credentials, that allow network users 106 to perform different actions, and be restricted from performing some actions.

In some instances, a same organization may have multiple accounts that have different network infrastructures. In such instances, the NAA system 104 may determine that proposed changes are to be sent to only specific user accounts 106 responsible for the resources/devices at issue (e.g., firewall control accounts versus routing accounts). That is, the NAA system 104 may work in conjunction with the IAM component 230 to determine what user accounts 232 are associated with a same organization.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
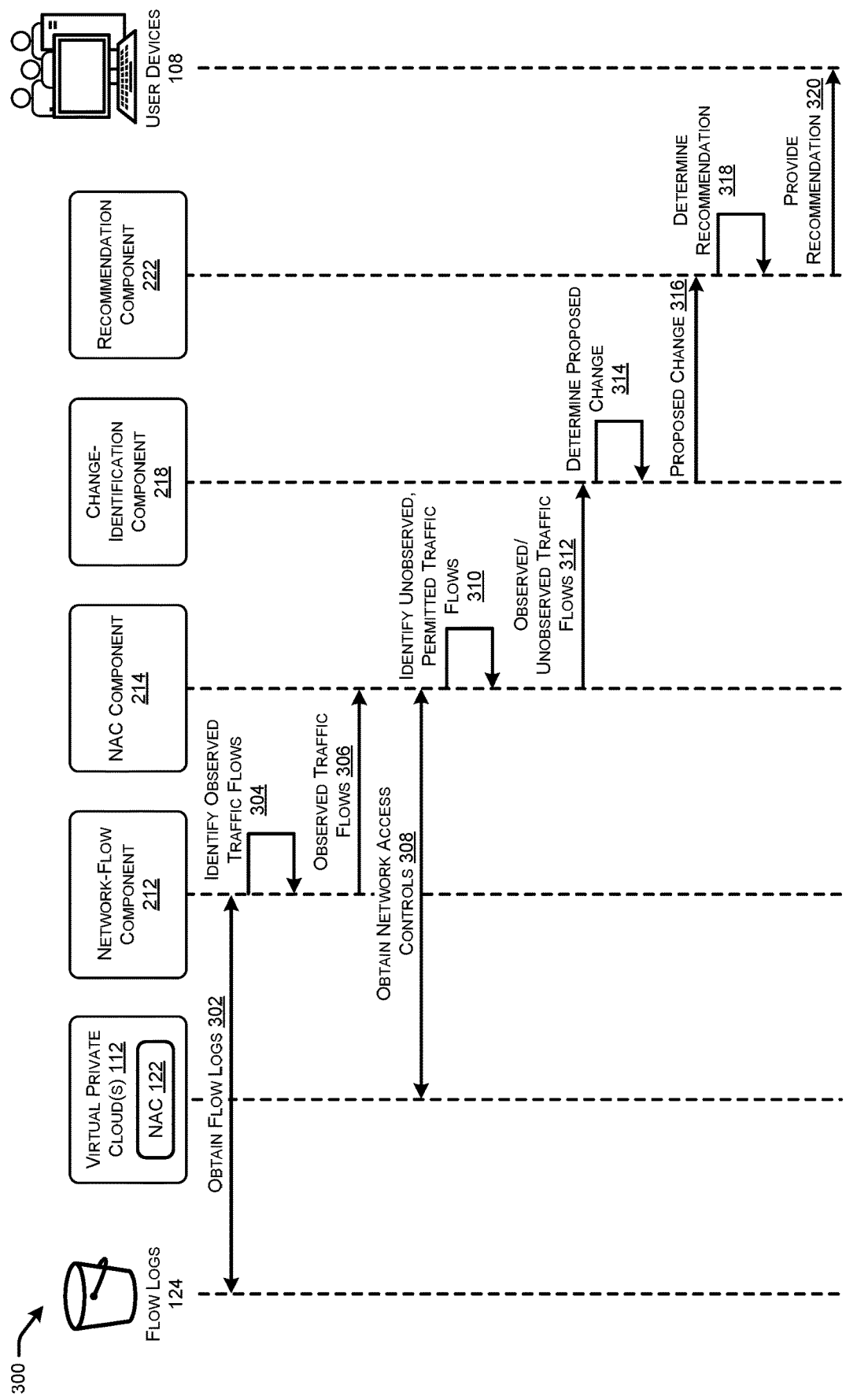
FIG. 3 illustrates a sequence diagram of an example process for a network-access analysis system to provide user accounts with recommendations for proposed changes to network access controls to restrict network access for traffic flows.

FIG. 3 illustrates a sequence diagram 300 of an example process for a network-access analysis system 104 to provide user accounts 232 with recommendations for proposed changes to network access controls 122 to restrict network access for traffic flows. The sequence diagram 300 illustrates an example of how the NAA system 104 can perform automated least privilege analysis and output recommendations to the VPC users to align their access settings with least privilege settings.

At 302, the network-flow component 212 may obtain flow logs 124 for various resources and/or network devices in or associated with a network. The process at 302 may be a push mechanism, a pull mechanism, and/or a combination thereof. The flow logs 124 may be obtained periodically, continuously, and/or in response to detect a change in flow logs 124.

At 304, the network-flow component 212 may identify observed traffic flows from the flow logs 124 during a period of time. For instance, the network-flow component 212 may analyze network flow data that was collected over the period of time (e.g., one week, one month, one year, etc.), and determine what traffic flows (e.g., 5-tuples) were observed in the network during that period of time. The network-flow component 212 may determine that these observed traffic flows are necessary, required, otherwise needed by the applications/resources in the network, and that they should be permitted access to the network by the network access controls.

At 306, the NAC component 214 may receive indications of the observed traffic flows from the network-flow component 212. At 308, the NAC component 214 may obtain network access controls 308 from the VPCs 112 (or other networks). The network access controls 308 may only be provided for users 106 that have opted in, or signed up for, use of the NAA system 104. The network access controls 122 may be associated with, or stored in connection with, the user accounts 106 and obtained from the user accounts 106.

At 310, the NAC component 214 may identify unobserved, but permitted, traffic flows for the network. For instance, the NAC component 214 may determine all permitted traffic flows based on analyzing the network access controls 122, and determine which of those traffic flows were not included in the observed traffic flows determined from the flow logs 124. At 312, the NAC component 214 may provide indications of the observed and unobserved traffic flows to the change-identification component 218.

The change-identification component 218 may determine proposed change(s) for the network access rules 122 based on the unobserved and/or observed traffic flows. For instance, the change-identification component 218 may determine prosed changes for the network access controls 122 that restrict network access for unobserved traffic flows. However, the change-identification component 218 may verify that the proposed changes do not restrict or otherwise affect the observed traffic flows.

Thus, the change-identification component 218 may verify or validate that the proposed changes do not restrict or affect the observed traffic flows. In some embodiments, the change-identification component 218 works by analyzing flow logs (e.g., records of TCP/IP packets) collected from the network. The change-identification component 218 statically analyzes the proposed change before it is recommended, and determines if the proposed change would alter the way any traffic observed in recent flow logs is handled (e.g., blocked, re-routed, etc.) For example, if the change-identification component 218 proposes to introduce a firewall rule that would block port 80, the change-identification component 218 will examine the flow logs for a recent period (e.g., the last 30 days), and determine if any of the packets from those logs that were previously accepted by that firewall used port 80. If not, the change will be deemed safe and allowed to be recommended. On the other hand, if the change-identification component 218 determines that a recently observed packet from the flow logs would have been blocked by the change, the change-identification component 218 will determine to not recommend the change.

For some large networks, flow logs can consist of vast quantities of data, such that direct analysis of the raw logs themselves would be computationally expensive to analyze. In such cases, iterating through each of the recorded packet logs and analyzing each one to determine if it would be blocked or re-routed by a proposed change would be computationally expensive. Accordingly, some embodiments of the change-identification component 218 will preprocess the flow logs and convert the logs into a more compact and symbolic representation, which can be used to perform the verification more quickly. This representation of the network flows, which may be termed an observed flow control model (OFCM) of the network, can be encoded in a variety of ways, such as a logical formula, a constraint program, or a Reduced Ordered Binary Decision Diagram. The change-identification component 218 may use a constraint solver or a series of Binary Decision Diagram operations to determine if packets in the flow log records would be altered by the proposed change without needing to examine each of the recorded packets individually.

At 316, the change-identification component may provide an indication of the proposed change(s) to the recommendation component 222. At 318, the recommendation component may determine or otherwise create a recommendation for the proposed change(s), and at 320, provide the recommendation(s) to the user device(s) 108. The recommendations may be provided in various ways, such as through a dashboard or console that is accessible via a user account, an application programming interface (API), and/or other electronic messaging/signaling methods or forms of communication.

FIG. 4 illustrates a graphical user interface (GUI) 400 through which a user 106 of a network can define parameters for an NAA system 104 to use when analyzing network access controls for the network. It should be understood that the GUI 400 is merely illustrative and any type of user interface, or combination of user interfaces, may be utilized by a user 106 to enable define analysis parameters.

The GUI 402 may include analysis timing options 402 through which the user 106 can select when they would like the analysis of their network access controls 122 to be performed. As shown, the user 106 may select periodic, in response to a configuration change (or any network change such as adding/removing resources and devices), and/or in response to a user request for the analysis. These are merely illustrative examples, and other timing options may be selected and used as well.

The GUI 402 may include NAC options 404 that allow a user 106 to select which NAC controls for which they would like the NAA system 104 to analyze and propose changes. The NAC options 404 include security groups, network ACLs, network firewalls, route tables, and IP addresses. However, other type of network access controls 122 may also be monitored and analyzed by the NAA system 104 as well.

The GUI 402 may further include a defined permitted flows option 406 through which a user 106 can define flows that they do not wish proposed changes for despite being unobserved or otherwise unrequired. For instance, the user 106 may desire that SSH access be enabled for emergencies to allow the user to log into a virtual machine and fix issues, despite this SSH access not being used too frequently.

The GUI 402 may include a permitted IP addresses option 408 through which a use 106 can define IP addresses that are always permitted to communicate traffic flows through their network, despite not being frequently used. The NAA system 104 may refrain from recommending proposed changes to restrict access for these IP addresses.

Figure 5:
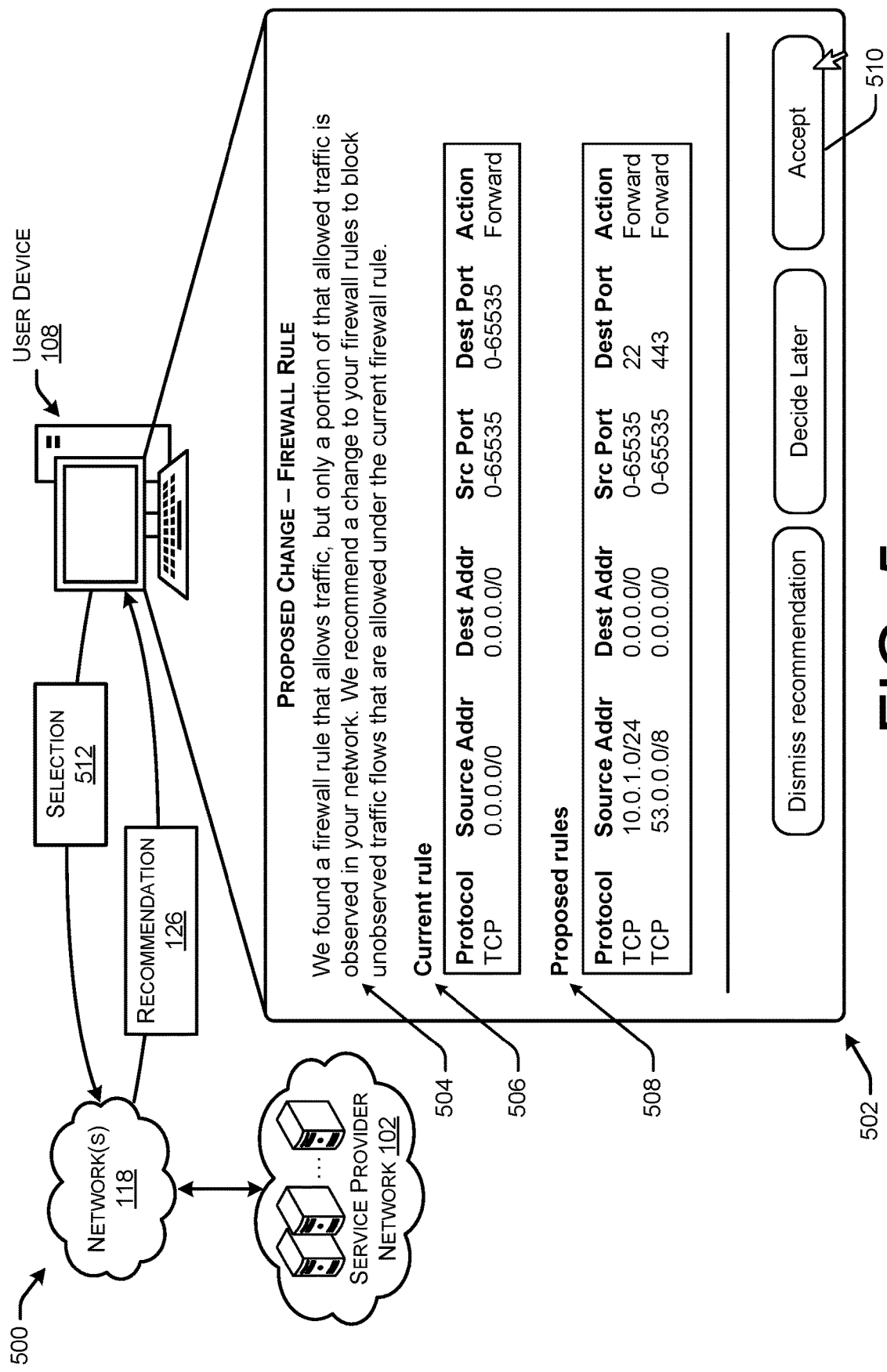
FIG. 5 illustrates a graphical user interface through which a network-access analysis system provides recommendations to a user for proposed changes to firewall rules for a network, and the user can view and accept the proposed changes through the interface.

FIG. 5 illustrates a graphical user interface 502 through which a network-access analysis system 104 provides recommendations to a user 106 for proposed changes to firewall rules for a network, and the user can view and accept the proposed changes through the interface.

As shown, the GUI 502 includes an explanation 504 as to why the proposed change to the firewall rule is being recommended. In this instance, the change is due to a firewall rule allowing traffic, but only a portion of the allowed traffic is observed in the network. The proposed change is to change the firewall rules to block the unobserved traffic flows that are allowed under the current firewall rule. The GUI 502 may further include an indication of the current rule 506, as well as an indication of the proposed rule(s) 508. In this case, the proposed rules 508 will more narrowly allow the observed traffic flows, but will no longer allow the unobserved traffic flows identified by the NAA system 104.

The GUI 502 further includes selectable options 510, such as an option to dismiss the recommendation, decide later on the recommendation, and/or accept the recommendation. Based on the selection, the user device 108 provides an indication of the selection 512 to the service provider network 102.

In examples where the user 106 decides to dismiss the recommendation, the NAA system 104 may track what recommendations are dismissed, and may refrain from recommending those proposed changes in future recommendations because the user 106 is uninterested in applying that recommendation.

Figure 6:
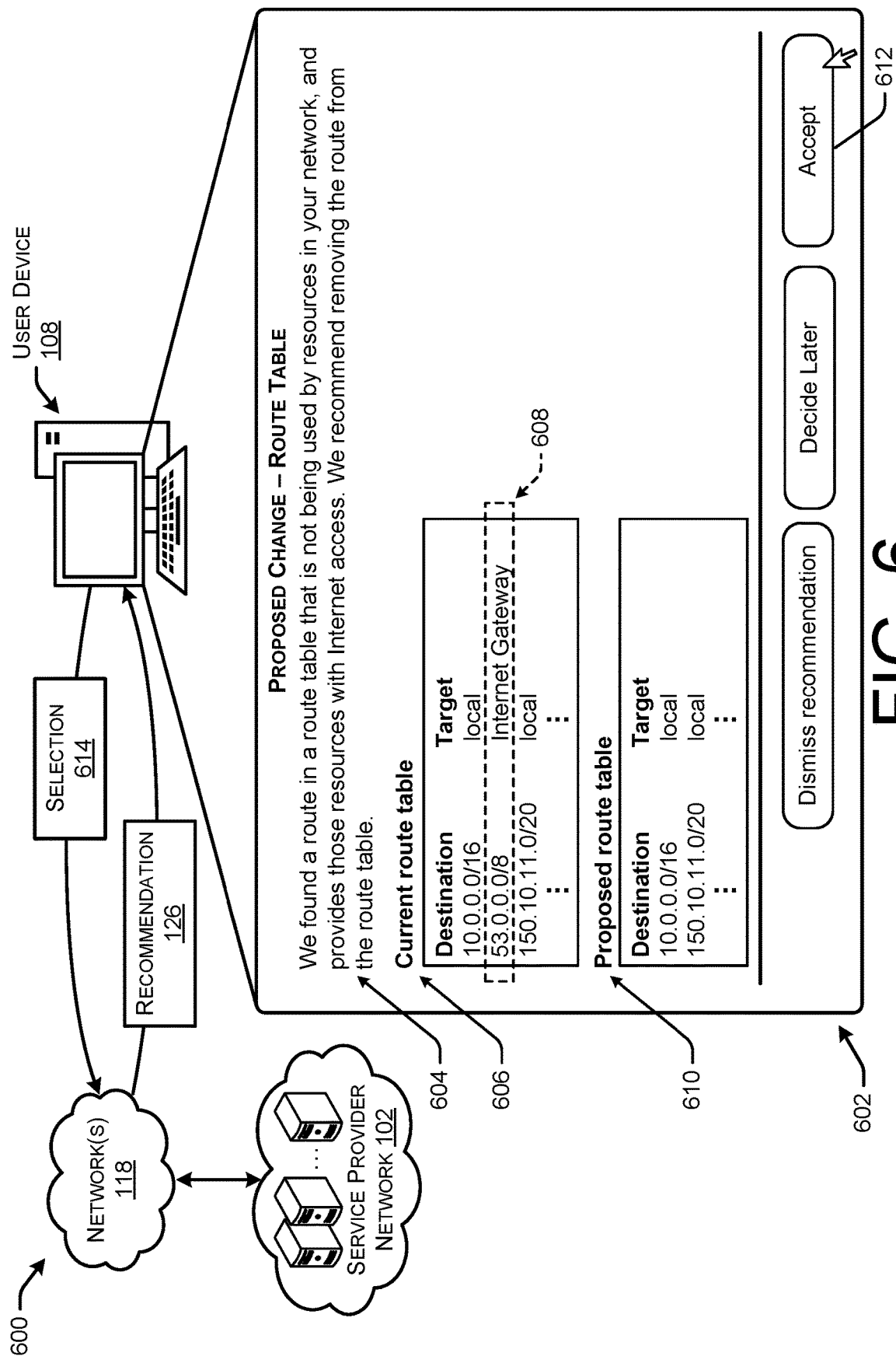
FIG. 6 illustrates a graphical user interface through which a network-access analysis system provides recommendations to a user for proposed changes to a route table for a network, and the user can view and accept the proposed changes through the interface.

FIG. 6 illustrates a graphical user interface 602 through which a network-access analysis system 104 provides recommendations 126 to a user 106 for proposed changes to a route table for a network, and the user 106 can view and accept the proposed changes through the interface 602.

As shown, the GUI 602 includes an explanation 604 as to why the proposed change to the route table is being recommended. In this instance, the change is due to a route in the route table not being used, and provides the resources with Internet access. The GUI 602 may further include an indication of the current route 606 in the route table, an indication of the unused route 608, as well as an indication of the proposed route table 610 after removing the rule. In this case, the unobserved route is dropped in the proposed route table 610 such that the resources do not have Internet access routes that are unused, open, and potentially vulnerable.

The GUI 602 further includes selectable options 612, such as an option to dismiss the recommendation, decide later on the recommendation, and/or accept the recommendation. Based on the selection, the user device 108 provides an indication of the selection 614 to the service provider network 102.

FIGS. 7A, 7B, 8, and 9 illustrate flow diagrams of example methods 700, 800, and 900 that illustrate aspects of the functions performed at least partly by the service provider network 102 as described in this disclosure. The logical operations described herein with respect to FIGS. 7A, 7B, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7A:
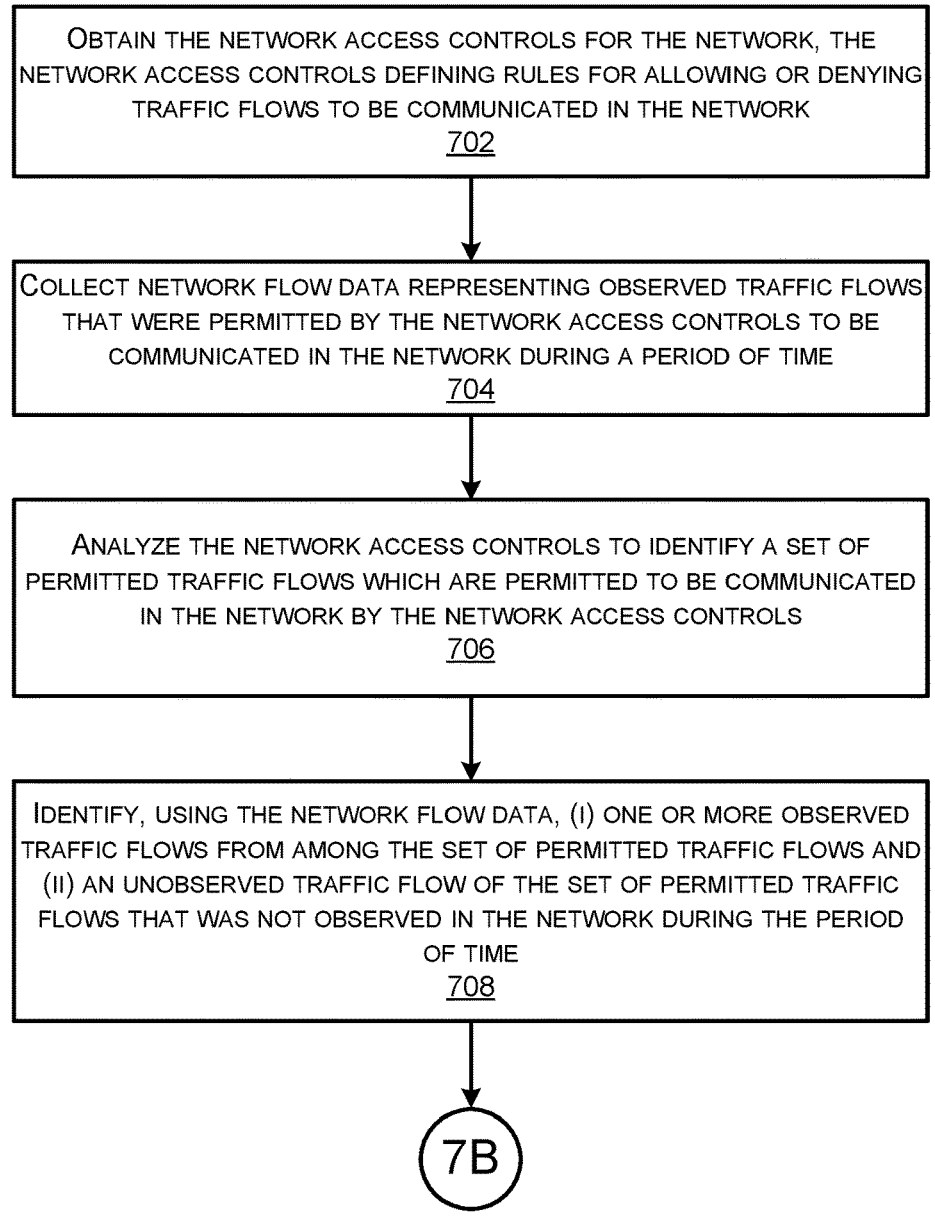
FIGS. 7A and 7B collectively illustrate a flow diagram of an example method for a network-access analysis system to identify traffic flows that are unobserved in a network, but admitted under the current network access controls, and provides a user account with a recommendation of a proposed change to the network access controls to restrict network access for the unobserved network flow.
Figure 7B:
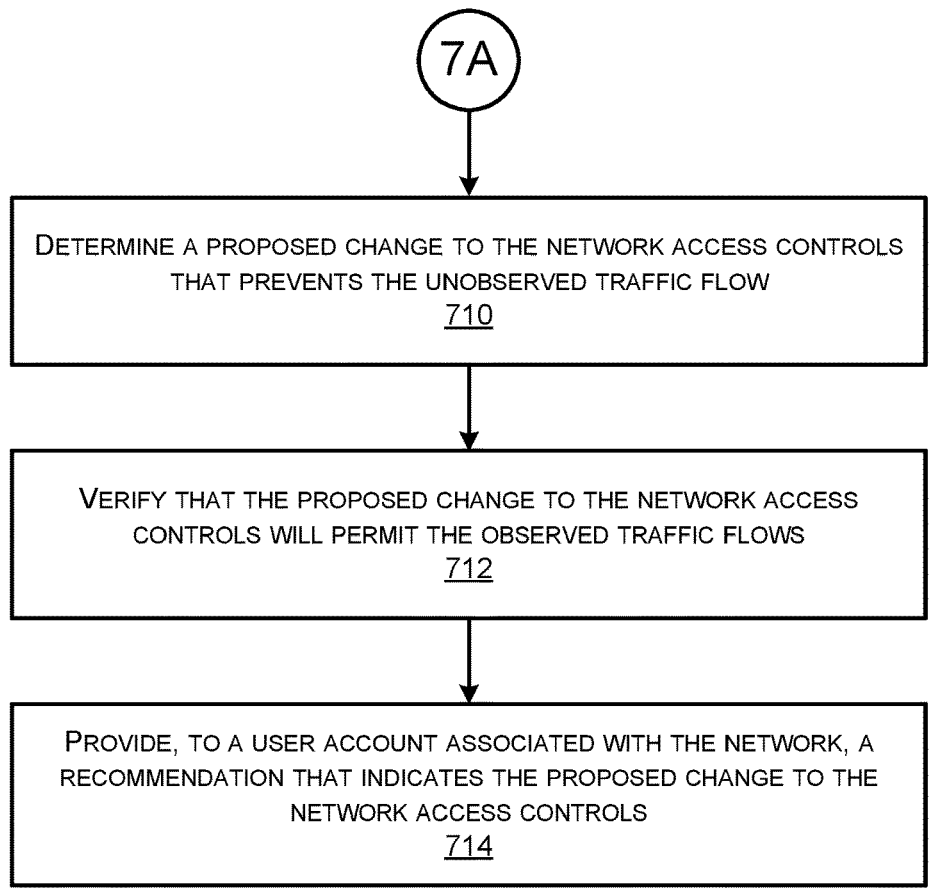

FIGS. 7A and 7B collectively illustrate a flow diagram of an example method for a network-access analysis system to identify traffic flows that are unobserved in a network, but admitted under the current network access controls, and provides a user account with a recommendation of a proposed change to the network access controls to restrict network access for the unobserved network flow.

At 702, the NAA system 104 may obtain the network access controls for the network where the network access controls define rules for allowing or denying traffic flows to be communicated in the network.

At 704, the NAA system 104 may collect network flow data representing observed traffic flows that were permitted by the network access controls to be communicated in the network during a period of time. The network flow data may be in the form of flow log records 124 and represent network traffic flows through various resources or components of the network. A flow log record 124 may capture traffic flow information such as a network IP traffic flow, which may be a 5-tuple on a per network interface basis, that occurs within an aggregation interval (or capture window).

At 706, the NAA system 104 may determine that a plurality of traffic flows are permitted to be communicated in the network by the network access controls where the plurality of traffic flows including the observed traffic flows.

For instance, the NAA system 104 may identify source and destination IP addresses (and/or source/destination ports), such as IP address ranges, that are indicated as "allowed" by firewall controls for the network. As another example, the NAA system may analyze route tables and identify sources and destinations of routes that terminate in, or pass through, the network. As a further example, the NAA system may identify IP addresses (e.g., classless inter-domain routing (CIDR) blocks) assigned for use by resources in the network and are allowed under firewall controls. In this way, the NAA system may determine what traffic flows (e.g., 5-tuples) are permitted or allowed access to the network under the current network access controls.

At 708, the NAA system 104 may identify, using the network flow data, that an unobserved traffic flow of the plurality of traffic flows was not observed in the network during the period of time. That is, the unobserved traffic flow may not be identified in the network flow log data for a period of time, but the unobserved traffic flow may be allowed by the network access rules.

At 710, the NAA system 104 may determine a proposed change to the network access controls that prevents the unobserved traffic flow from being allowed to be communicated in the network.

For instance, the NAA system 104 may determine a change such as adding, or modifying, firewall controls to change IP addresses for the unobserved traffic flow from "allow" to "deny" such that traffic on the unobserved traffic flow is no longer given network access. As another example, the NAA system 104 may determine a proposed change to a route table by removing, or modifying, a route in a routing table that prevents the unobserved traffic flow from being allowed to be communicated in the network. As further examples, the NAA system 104 may modify route tables, firewall rules, load balancing policies, etc., such that unobserved traffic flow is only allowed access to resources or applications in the network for which there are no security concerns or other concerns At 712, the NAA system 104 may verify that the proposed change to the network access controls will permit the observed traffic flows to be communicated in the network. For example, the NAA system 104 may analyze the network flow data (e.g., records of TCP/IP packets), and determine if the proposed change would alter the way any observed traffic flows in the network flow data are handled (e.g., blocked, re-routed, etc.).

At 714, the NAA system 104 may provide, to a user account associated with the network, a recommendation that indicates the proposed change to the network access controls.

Figure 8:
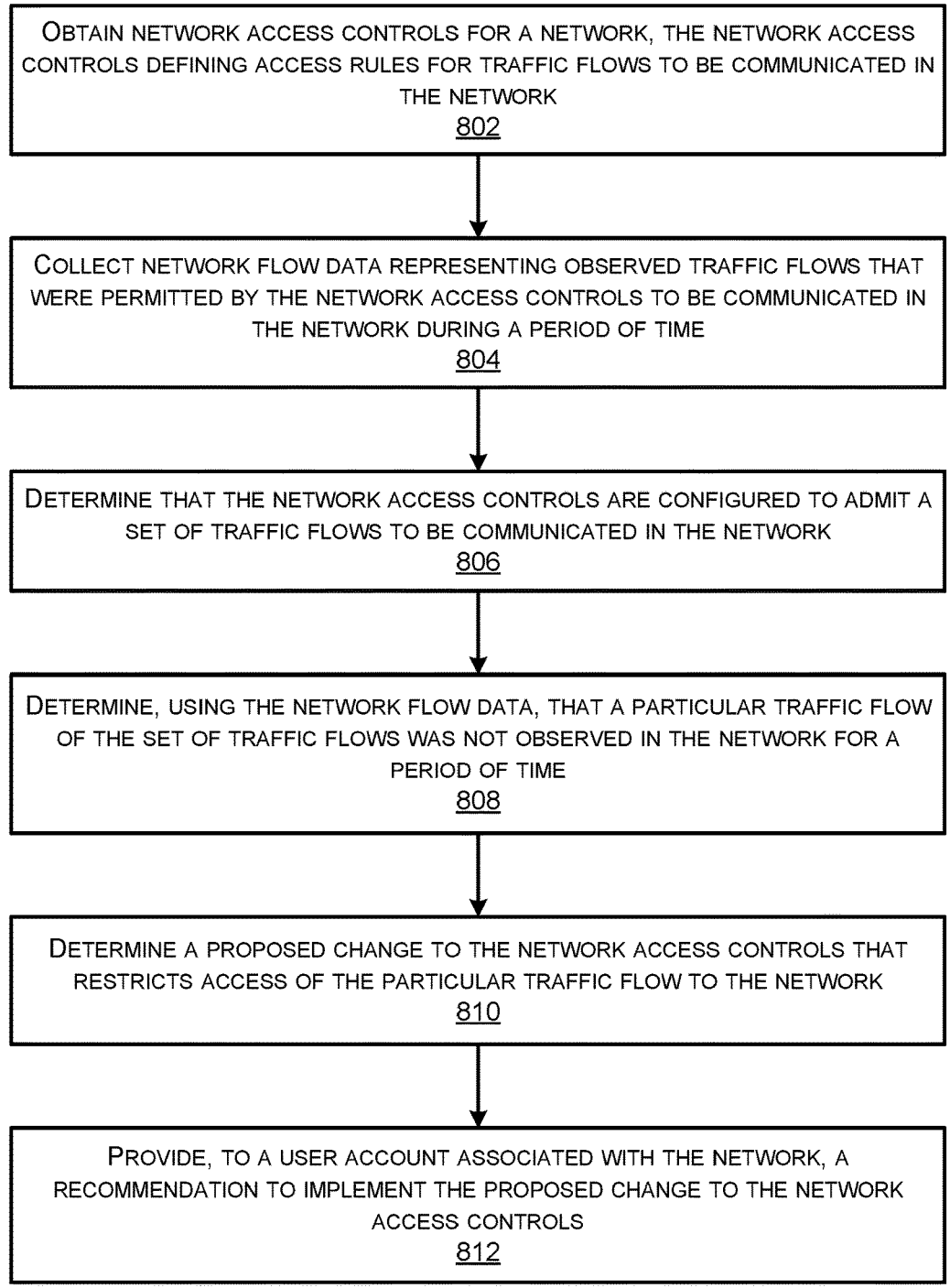
FIG. 8 illustrates a flow diagram of an example method for a network-access analysis system to identify an unobserved traffic flow with access to a network, and provide a user account with a proposed change for the network access controls to restrict network access of the unobserved traffic flow.

FIG. 8 illustrates a flow diagram of an example method for a network-access analysis system to identify an unobserved traffic flow with access to a network, and provide a user account with a proposed change for the network access controls to restrict network access of the unobserved traffic flow.

At 802, the NAA system 104 may obtain network access controls for a network, the network access controls defining access rules for traffic flows to be communicated in the network. The network access controls may include one or more of firewall rules, route tables, load balancing policies, IP addresses, and/or any other controls or rules that can allow, deny, or at least partially allow/deny access through or in a network.

At 804, the NAA system 104 may collect network flow data representing observed traffic flows that were permitted by the network access controls to be communicated in the network during a period of time. The network flow data may be in the form of flow log records 124 and represent network traffic flows through various resources or components of the network. A flow log record 124 may capture traffic flow information such as a network IP traffic flow, which may be a 5-tuple on a per network interface basis, that occurs within an aggregation interval (or capture window).

At 806, the NAA system 104 may determine that the network access controls are configured to admit a plurality of traffic flows to be communicated in the network. For instance, the NAA system 104 may identify source and destination IP addresses (and/or source/destination ports), such as IP address ranges, that are indicated as "allowed" by firewall controls for the network. As another example, the NAA system may analyze route tables and identify sources and destinations of routes that terminate in, or pass through, the network. As a further example, the NAA system may identify IP addresses (e.g., classless inter-domain routing (CIDR) blocks) assigned for use by resources in the network and are allowed under firewall controls. In this way, the NAA system may determine what traffic flows (e.g., 5-tuples) are permitted or allowed access to the network under the current network access controls.

At 808, the NAA system 104 may determine, using the network flow data, that a particular traffic flow of the plurality of traffic flows was not observed in the network for a period of time.

At 810, the NAA system 104 may determine a proposed change to the network access controls that restricts access of the particular traffic flow to the network. In some instances, the change may restrict all access to the network, and in some instances the change may restrict some access but allow other types of access (e.g., access to specific resources, subnets, etc.).

In some instances, the NAA system 104 may further analyze the network access controls to determine an equivalence class that indicates an equivalence relationship for a group of the network access controls, and determine a plurality of proposed changes to the network access controls that restrict access of the particular traffic flow to the network. Further, the NAA system 104 may select, from amongst the plurality of proposed changes, the proposed change based at least in part on the proposed change having the equivalence relationship with the group of the network access controls.

At 812, the NAA system 104 may provide, to a user account associated with the network, a recommendation to implement the proposed change to the network access controls.

In some examples, the NAA system 104 may determine that it had provided the user account with a previous recommendation to implement a second proposed change to the network access controls at a previous time, and may refrain from providing the user account with another recommendation to implement the second proposed change based at least in part on the previous recommendation. In this way, the NAA system 104 may avoid flooding a user account with recommendations for proposed changes they have previously ignored and/or do not which to implement.

In some examples, the NAA system 104 may receive, from the user account, an indication that a specific traffic flow is to be allowed to be communicated through the network, and add the specific traffic flow to the network flow data representing the observed traffic flows. Further, the NAA system 104 may determine proposed changes for a group of the plurality of traffic flows based at least in part on the group not being in the observed traffic flows, wherein the proposed changes do not restrict access by the specific traffic flow to the network. In this way, the user account may specify traffic flows that may not be observed, but for which the user does not wish to receive proposed changes.

Figure 9:
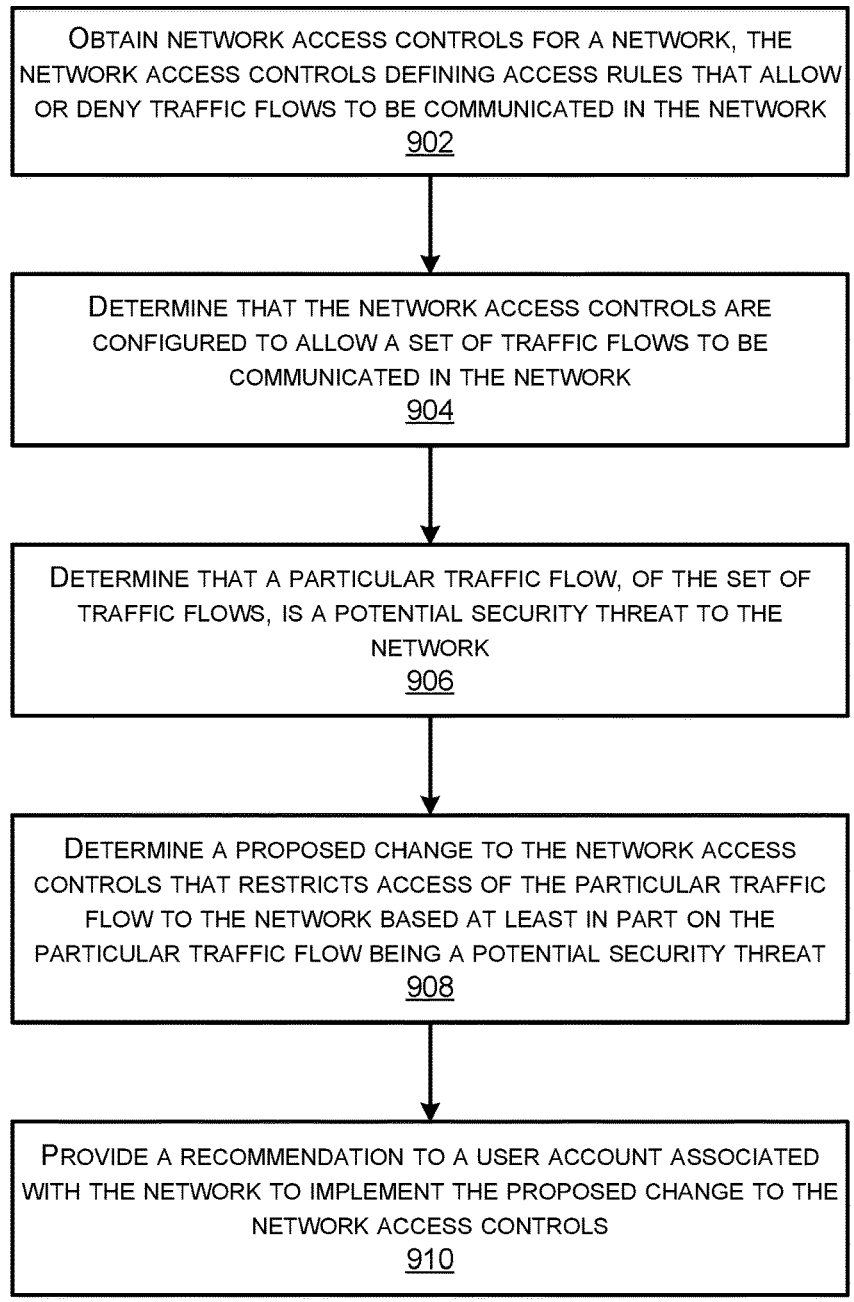
FIG. 9 illustrates a flow diagram of an example method for a network-access analysis system to identify a traffic flow that is a potential security threat to a network, and provide a user account with a proposed change for the network access controls to restrict network access of the traffic flow.

FIG. 9 illustrates a flow diagram of an example method for a network-access analysis system to identify a traffic flow that is a potential security threat to a network, and provide a user account with a proposed change for the network access controls to restrict network access of the traffic flow.

At 902, the NAA system 104 may obtain network access controls for a network, the network access controls defining access rules that allow or deny traffic flows to be communicated in the network. At 904, the NAA system 104 may determine that the network access controls are configured to allow a plurality of traffic flows to be communicated in the network.

At 906, the NAA system 104 may determine that a particular traffic flow, of the plurality of traffic flows, is a potential security threat to the network. For instance, the particular traffic flow may simply be unobserved. As another example, the particular traffic flow may be blocked by an inner-layer network access control, but not an outer-layer network access control for the network.

At 908, the NAA system 104 may determine a proposed change to the network access controls that restricts access of the particular traffic flow to the network based at least in part on the particular traffic flow being a potential security threat. The proposed change may, for example, cause the particular traffic flow to be dropped at the outer-layer network access control.

At 910, the NAA system 104 may provide a recommendation to a user account associated with the network to implement the proposed change to the network access controls.

Figure 10:
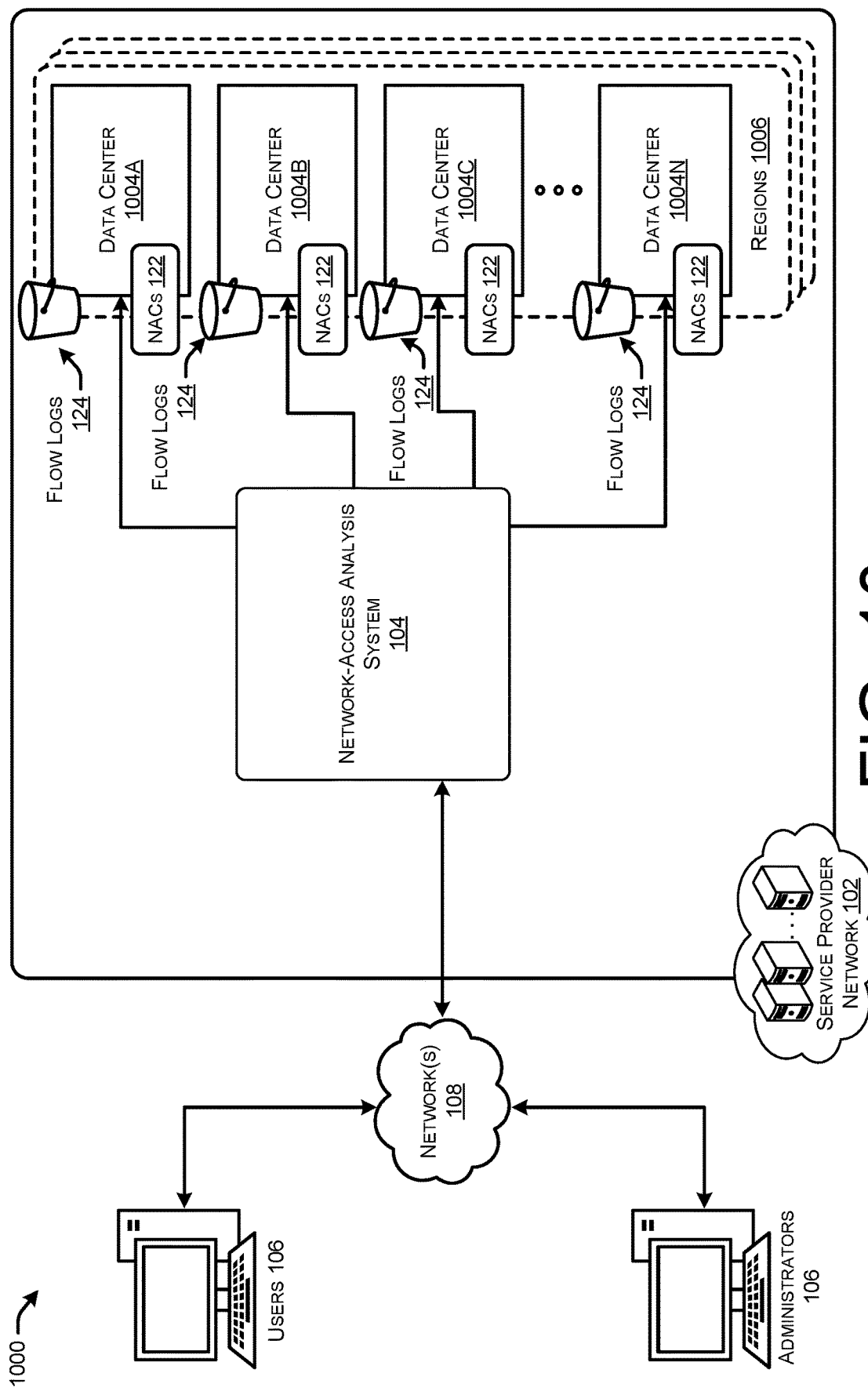
FIG. 10 is a system and network diagram that shows an illustrative operating environment that includes data centers of a service provider network that can be configured to implement aspects of the functionality described herein.

FIG. 10 is a system and network diagram 1000 that shows an illustrative operating environment that includes data centers 1004 in one or more regions 1006 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1008. One illustrative embodiment for a data center 1004 that can be utilized to implement the technologies disclosed herein will be described below with regard to FIG. 11.

The users 106, such as administrators 106, of the user devices 108 that utilize the service provider network 102 may access the computing resources provided by the service provider network 102 over any wired and/or wireless network(s) 108, which can be a wide area communication network ("WAN"), such as the Internet, an intranet or an Internet service provider ("ISP") network or a combination of such networks. For example, and without limitation, a user device operated by a user 106 of the service provider network 102 may be utilized to access the service provider network 102 by way of the network(s) 118. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
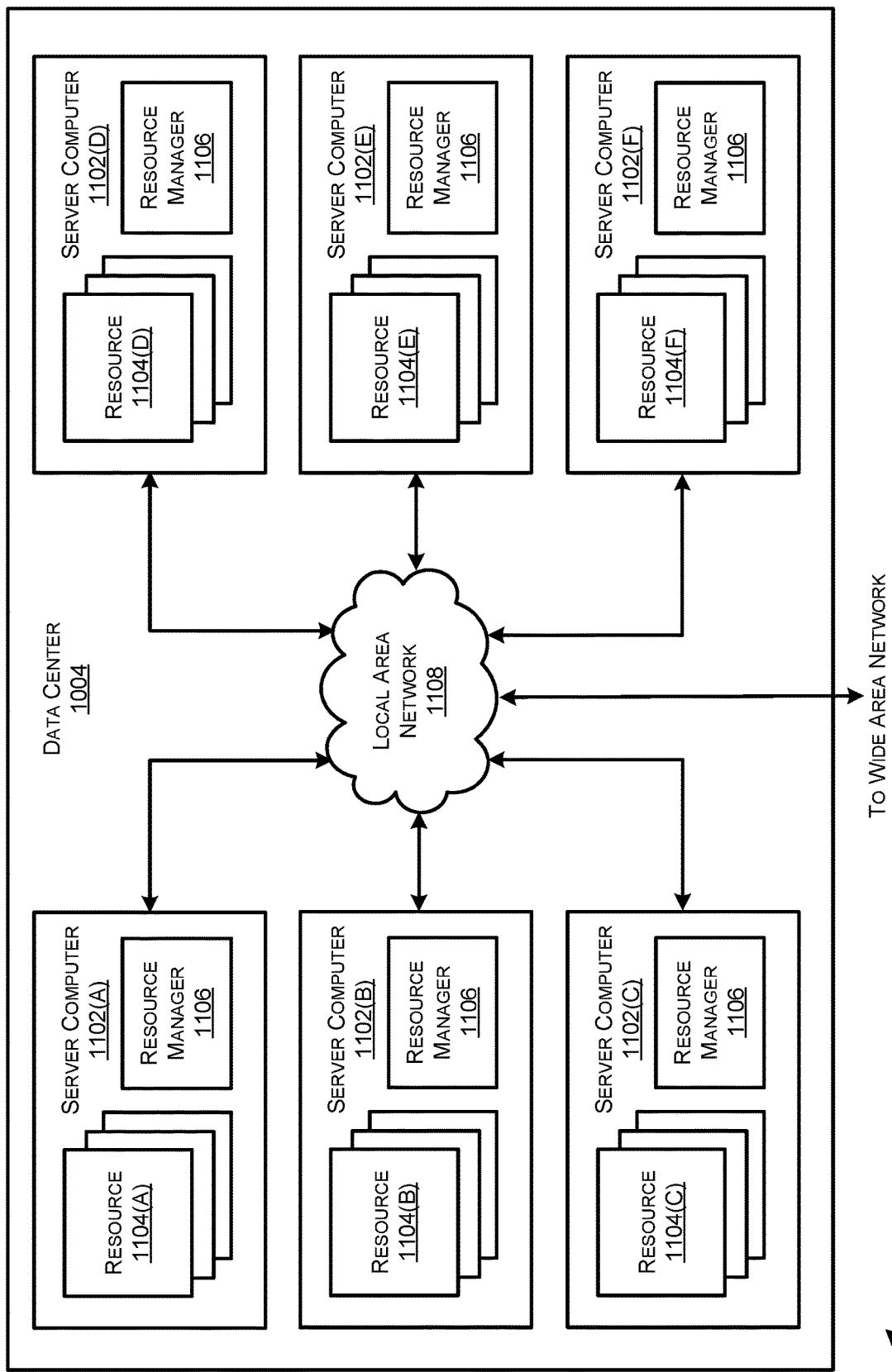
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

Figure 12:
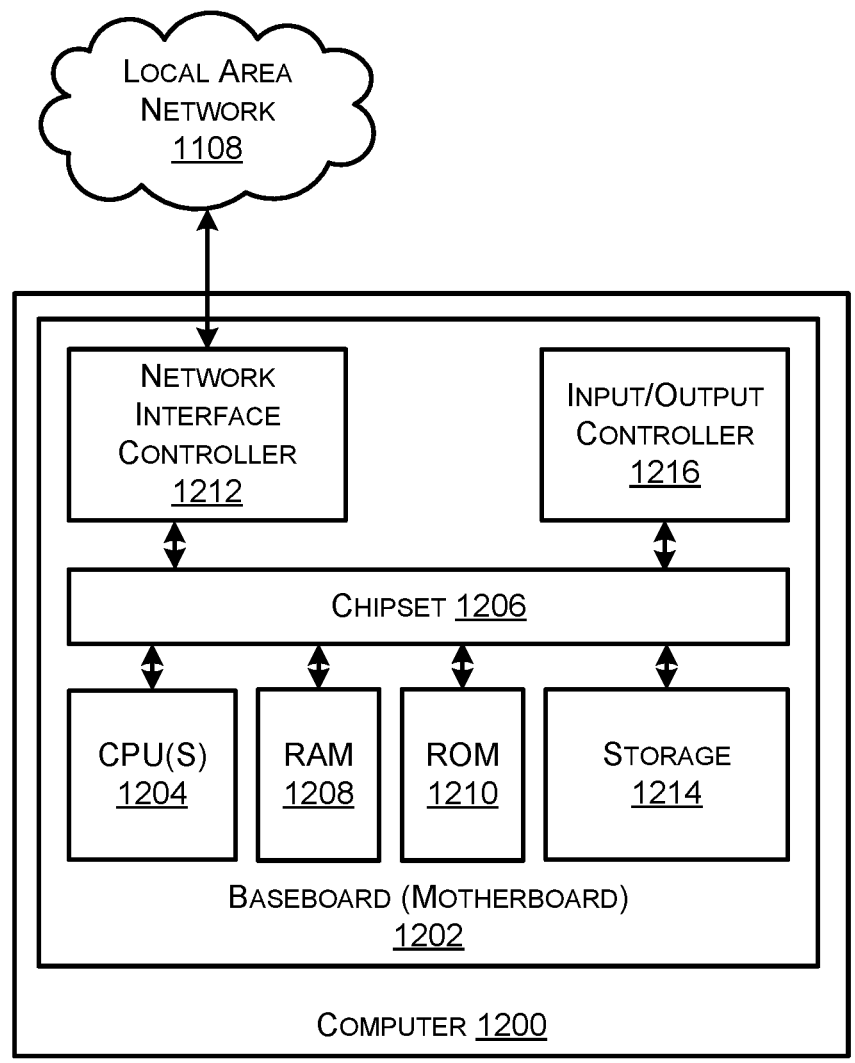
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1208. The chipset 1206 can include functionality for providing network connectivity through a network interface controller (NIC) 1212, such as a gigabit Ethernet adapter. The NIC 1212 is capable of connecting the computer 1200 to other computing devices over the network 1208 (or 104). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A network-access analysis system that determines proposed changes for network access controls for a network, the network-access analysis system comprising:

one or more processors; and one or more computer-readable media storing computer-executable instructions that, when executed by the one or more processors, cause the network-access analysis system to perform operations including:

obtaining the network access controls for the network, the network access controls defining rules for allowing or denying traffic flows to be communicated in the network;

collecting network flow data representing observed traffic flows having observed network identifiers that were permitted by the network access controls to be communicated in the network during a period of time;

analyzing the network access controls to identify permitted network identifiers corresponding to a set of permitted traffic flows which are permitted to be communicated in the network by the network access controls;

determining, using the network flow data and the network access controls, that a particular permitted network identifier of the permitted network identifiers was not observed as being associated with any observed traffic flows in the network during the period of time;

determining a proposed change to the network access controls that prevents subsequent traffic flows having the particular permitted network identifier from being communicated in the network;

verifying that the proposed change to the network access controls will permit the observed traffic flows; and providing, to a user account associated with the network, a recommendation that indicates the proposed change to the network access controls.

2. The network-access analysis system of claim 1, wherein:

the network-access analysis system is managed by a cloud provider network;

the network is a virtual private cloud (VPC) in which virtual resources are launched on behalf of the user account in the cloud provider network; and the network-access analysis system is configured to determine proposed changes for the network access controls for the VPC in response to a request from the user account, periodically, or in response to detecting a network configuration change associated with the VPC.

3. The network-access analysis system of claim 1, wherein the proposed change is at least one of:

an addition of, or modification to, a firewall rule that denies the subsequent traffic flows having the particular permitted network identifier from being allowed to be communicated in the network;

a removal of, or modification to, a route in a routing table that prevents the subsequent traffic flows having the particular permitted network identifier from being allowed to be communicated in the network;

a removal of an unused Internet Protocol (IP) address from an IP address space allocated for use by components associated with the network; and a modification to a load balancing policy associated with the network that prevents the subsequent traffic flows having the particular permitted network identifier from being communicated in the network.

4. A method performed at least partly by a network-access analysis system, the method comprising:

obtaining network access controls for a network, the network access controls defining access rules indicating permitted network identifiers that permit a set of traffic flows to be communicated in the network;

collecting network flow data representing observed traffic flows associated with individual ones of the permitted network identifiers that were permitted by the network access controls to be communicated in the network during a period of time;

determining, using the network flow data, that a particular permitted network identifier of the permitted network identifiers was not observed as being associated with any of the observed traffic flows in the network for a period of time;

determining a proposed change to the network access controls that restricts access of subsequent traffic flows having the particular permitted network identifier from being communicated in the network; and providing, to a user account associated with the network, a recommendation to implement the proposed change to the network access controls.

5. The method of claim 4, further comprising verifying that the proposed change to the network access controls will permit the observed traffic flows to be communicated in the network.

6. The method of claim 4, wherein the proposed change is at least one of:

an addition of, or modification to, a firewall rule that restricts the subsequent traffic flows having the particular permitted network identifier from being allowed to be communicated in at least a portion of the network;

a removal of, or modification to, a route in a routing table that prevents the subsequent traffic flows having the particular permitted network identifier from being allowed to be communicated in the network;

a removal of an unused Internet Protocol (IP) address from an IP address space allocated for use by components associated with the network; and a modification to a load balancing policy associated with the network that restricts the subsequent traffic flows having the particular permitted network identifier from being allowed to be communicated in at least a portion of the network.

7. The method of claim 4, further comprising:
analyzing the network access controls to determine an equivalence class that indicates an equivalence relationship for a group of the network access controls;
determining a set of proposed changes to the network access controls that restrict access of the subsequent traffic flows having the particular permitted network identifier to the network; and
selecting, from amongst the set of proposed changes, the proposed change based at least in part on the proposed change having the equivalence relationship with the group of the network access controls.

8. The method of claim 4, further comprising:
determining that the network-access analysis system had provided the user account with a previous recommendation to implement a second proposed change to the network access controls at a previous time; and
refraining from providing the user account with another recommendation to implement the second proposed change based at least in part on the previous recommendation.

9. The method of claim 4, further comprising:
detecting a network configuration change made to the network; and
determining to analyze the network access controls to identify the proposed change in response to detecting the network configuration change.

10. The method of claim 4, further comprising:
receiving, from the user account, an indication that a specific traffic flow is to be allowed to be communicated through the network;
adding the specific traffic flow to the network flow data representing the observed traffic flows; and
determining proposed changes for a group of the set of traffic flows based at least in part on the group not being in the observed traffic flows, wherein the proposed changes do not restrict access by the specific traffic flow to the network.

11. The method of claim 4, the method further comprising:
receiving user approval of the recommendation to implement the proposed change to the network access controls; and
applying the proposed change to the network access controls based at least in part on the user approval.

12. The method of claim 4, further comprising:
the network-access analysis system is managed by a cloud provider network:
the network is a virtual private cloud (VPC) in which virtual resources are launched on behalf of the user account in the cloud provider network; and
the network-access analysis system is configured to determine proposed changes for the network access controls for the VPC in response to a request from the user account, periodically, or in response to detecting a network configuration change associated with the VPC.

13. One or more non-transitory computer-readable media storing computer-executable instructions that, when executed on one or more processors, cause a network-access analysis (NAA) system to perform operations comprising:
obtaining network access controls for a network, the network access controls defining access rules that allow or deny traffic flows to be communicated in the network;
determining that the network access controls are configured to allow a set of traffic flows to be communicated in the network;
determining that a particular traffic flow, of the set of traffic flows, is a potential security threat to the network;
determining a proposed change to the network access controls that restricts access of the particular traffic flow to the network based at least in part on the particular traffic flow being a potential security threat; and
providing a recommendation to a user account associated with the network to implement the proposed change to the network access controls.

14. The one or more non-transitory computer-readable media of claim 13, the operations performed by the NAA system further comprising:
collecting network flow data representing observed traffic flows that were permitted by the network access controls to be communicated in the network during a period of time,
wherein determining that the particular traffic flow is a potential security threat includes determining, using the network flow data, that the particular traffic flow was not observed in the network during the period of time.

15. The one or more non-transitory computer-readable media of claim 13, the operations performed by the NAA system further comprising:
collecting network flow data representing observed traffic flows that were permitted by the network access controls to be communicated in the network during a period of time; and
verifying that the proposed change to the network access controls will permit the observed traffic flows to be communicated in the network.

16. The one or more non-transitory computer-readable media of claim 13, the operations performed by the NAA system further comprising:
analyzing the network access controls to determine an equivalence class that indicates an equivalence relationship for a group of the network access controls;
determining a set of proposed changes to the network access controls that restrict access of the particular traffic flow to the network; and
selecting, from amongst the set of proposed changes, the proposed change based at least in part on the proposed change having the equivalence relationship with the group of the network access controls.

17. The one or more non-transitory computer-readable media of claim 13, the operations performed by the NAA system further comprising:
detecting a network configuration change made to the network; and
determining to analyze the network access controls to identify the proposed change in response to detecting the network configuration change.

18. The one or more non-transitory computer-readable media of claim 13, the operations performed by the NAA system further comprising:
receiving, from the user account, user approval of the recommendation to implement the proposed change to the network access controls; and
applying the proposed change to the network access controls based at least in part on the user approval.

19. The one or more non-transitory computer-readable media of claim 13, wherein:
the NAA system is managed by a cloud provider network:

the network is a virtual private cloud (VPC) in which virtual resources are launched on behalf of the user account in the cloud provider network; and the NAA system is configured to determine proposed changes for the network access controls for the VPC in response to a request from the user account, periodically, or in response to detecting a network configuration change associated with the VPC.

20. The one or more non-transitory computer-readable media of claim 13, wherein the proposed change is at least one of:

an addition of, or modification to, a firewall rule that denies the particular traffic flow from being allowed to be communicated in the network;

a removal of, or modification to, a route in a routing table that prevents the particular traffic flow from being allowed to be communicated in the network;

a removal of an unused Internet Protocol (IP) address from an IP address space allocated for use by components associated with the network; and a modification to a load balancing policy associated with the network that prevents the particular traffic flow from being communicated in the network.

\* \* \* \* \*